United States Patent [19]
Kresch

[11] 3,984,645
[45] Oct. 5, 1976

[54] LIGHTWEIGHT HEADSET AND RETRACTABLE CORD SPOOL

[76] Inventor: Warren J. Kresch, 41932 Via San Luis Rey, Fremont, Calif. 94538

[22] Filed: Dec. 2, 1974

[21] Appl. No.: 528,841

[52] U.S. Cl. ............................ 179/156 A; 179/155
[51] Int. Cl.² ...................... H04M 1/05; H04M 1/15
[58] Field of Search ............ 179/155, 156 R, 156 A, 179/167, 178

[56] References Cited
UNITED STATES PATENTS
2,353,070   7/1944   Pitkin ............................. 179/156 A FOREIGN PATENTS OR APPLICATIONS
402,322   3/1943   Italy ..................................... 179/155
166,920   4/1934   Switzerland ......................... 179/155
283,939   9/1950   Switzerland ......................... 179/178

*Primary Examiner*—William C. Cooper

[57] ABSTRACT

A lightweight headset for communication systems having a cord spool with a retraction mechanism for storing a cord which is electrically connected at one end of the headset and at the other end to a plug. The cord spool, wearable on the person of a user, allows a substantial portion of the cord at the plug end to be contained within the case and extended for use when necessary.

4 Claims, 4 Drawing Figures

LIGHTWEIGHT HEADSET AND RETRACTABLE CORD SPOOL

BACKGROUND AND SUMMARY OF THE INVENTION

This invention relates to headsets, particularly lightweight headsets used in communication systems, such as air traffic controller stations and telephone communication systems. In certain communication operations or systems, headsets are worn by persons who must often be mobile. For example, in an air traffic controller's occupation, aircraft must be observed from various positions in a control tower. With several persons operating in a small area, often the long, loose cords of conventional headsets become tangled. The possibility of the headset becoming dislodged or the terminal plug pulling out at a crucial moment is a serious problem. In other occupations, such as a field repairman for communication systems, a portable headset with cord terminal is often used to test circuits in the field. The cord terminal has, in the past, comprised a length of cord with a conventional plug or alligator clip terminal. The loose cord, however, is often a nuisance when not in use.

The use of a retractable cord spool, therefore, has the advantage of controlling the length of cord outstanding during hookup of the headset, and storing the length of cord when the headset is not hooked into a communication circuit. The headset and cord spool comprise a unit interconnected by a segment of cord. In the preferred embodiment, a transmission switch is included in the segment of cord between the headset and cord spool. The transmission switch merely electrically connects or disconnects the transmission of signals from or to the headset. Because such signals are of low voltage, the electrical circuit lines in the cord are small in cross section, thus allowing a small or thin cord to be utilized. The cord spool utilizes a spool mechanism to retract and store a substantial segment of cord within the case. Because a small or thin cord can be utilized, the cord spool can store a substantial length of cord and still be constructed into a compact and portable component which is attachable to the person of a user. The terminal end of the retractable segment of the cord includes a transmission plug in the preferred embodiment, and may alternately include a pair of alligator clips or some other electrical connection means for connecting the headset with an auxilliary component or electrical circuit.

DETAILED DESCRIPTION OF THE PREFERRED EMBODIMENT

Figure 1:
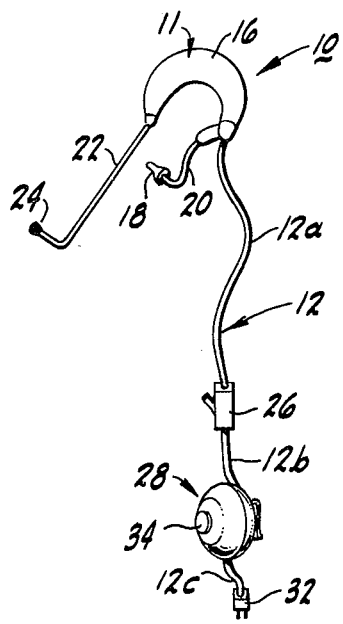
FIG. 1 is a perspective view of the headset and cord spool unit.

Referring to FIG. 1, the overall headset and cord spool unit, designated by the general reference numeral 10, includes a headset 11 with an extension cord 12 connected at its terminal end to a transmission plug 32. The headset 11 is a miniature type having an ear rest 16 for supporting the headset on the ear of a user. An ear plug 18 is connected to the ear rest 16 by a short electrical line 20, which transmits audio signals to one ear of the user. A rigid extension 22 at the end of the ear rest 16 positions a miniature transducer 24 in the distal end of the extension in front of a user's mouth to transmit communications from the user to an auxilliary system on a second transmission line (not visible). While a headset of the transmitter-receiver type is shown in the preferred embodiment, it is intended that a simple receiver or other type headset; for example, a two-ear headphone may be used in combination with the cord spool in this invention.

As shown in FIG. 1, the cord 12 includes one segment 12a between the headset 11 and a transmission key 26. The transmission key 26 is customarily included in the transmission lines of air control communication systems to switch from transmit to receive. In other systems, the key may comprise an off-on switch for all lines to the headset. The transmission key 26 is located for ready access by an operator.

A cord spool 28 is adapted to be attached to the belt (not shown) of an operator for convenient mobility by a belt clip 30. Other attachment means, such as a buttonhook or safety pin, may be utilized for operators not wearing a belt. The belt clip 30, however, is perhaps the most convenient means for attachment in the general circumstance. A short segment 12b of cord 12 extends between the transmission key and the cord spool 28.

The cord spool 28 contains and stores an extractable long segment 12c of cord 12, a portion of which is shown withdrawn from the spool in FIG. 1. At the end of the extractable segment 12c of cord 12 is a transmission-receiver plug 32. The transmission-receiver plug 32 in an air controller communication system is adapted to plug into a jack socket (not shown) customarily located at a plurality of stations in an air controller tower. Other terminals designed for particular systems may be substituted for the transmission-receiver plug 32.

Figure 2:
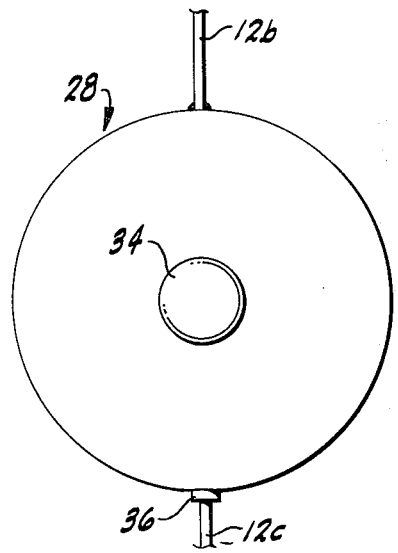
FIG. 2 is a front elevational view of the cord spool of the unit in FIG. 1.

Referring to FIG. 2, the cord spool 28 is shown in greater detail. The cord spool 28 is circular in configuraton having a centrally located return button 34 which operates a return mechanism to retract the cord which has been pulled from the bottom of the spool 28 through a guide opening 36.

Figure 3:
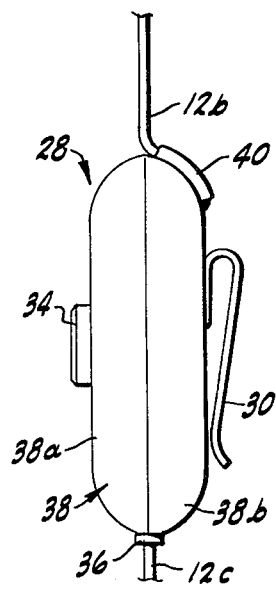
FIG. 3 is a side elevational view of the cord spool of FIG. 2.

The compact configuration of the cord spool is shown in the side elevational view of FIG. 3. The return button 34 projects from the body of a contoured case 38 of the cord spool. The cord segment 12b, leading into the top of case 38, is contained within a protective bead 40 running from the top of the case to the center of the back of the case for connection with the rectractable segment 12c of cord wound within the container. The belt clip 30 is fixed to the back of the case 38 such that the cord spool can be fixed to the belt of an operator with the return button 34 readily accessible.

Figure 4:
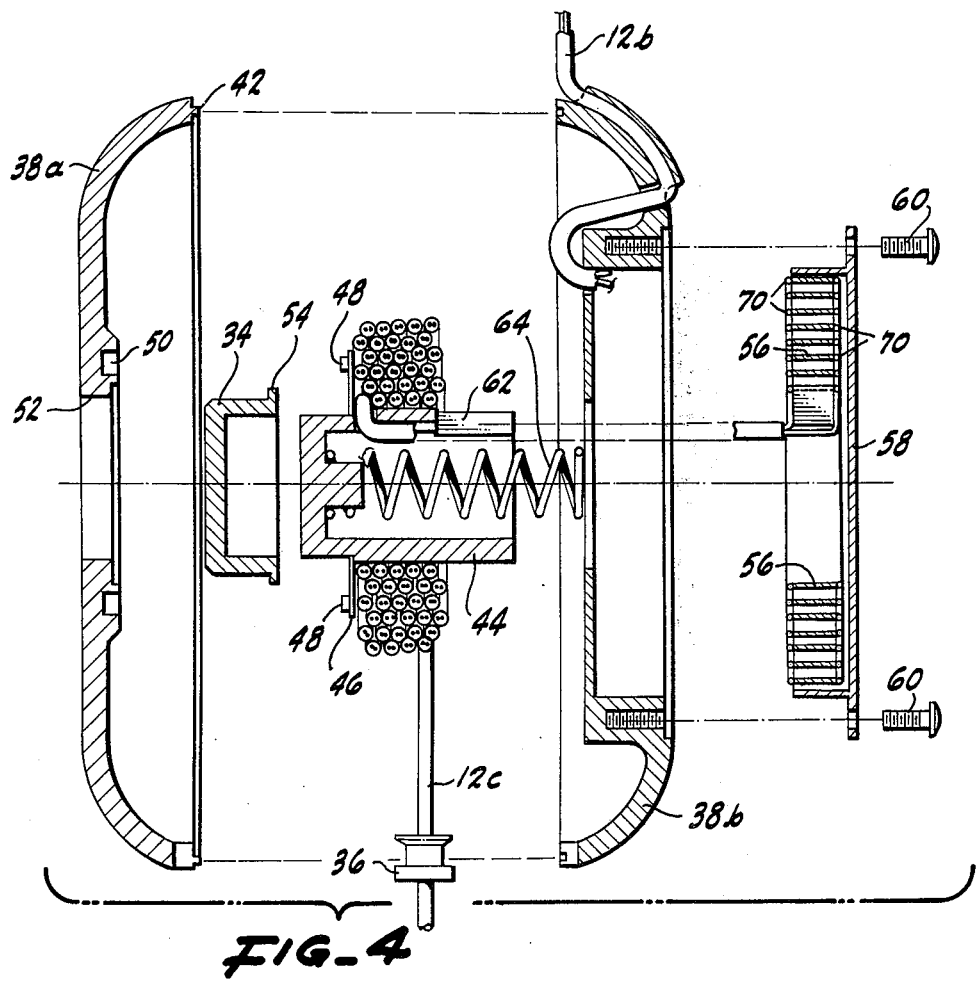
FIG. 4 is an exploded view of the cord spool of FIG. 3.

Referring to the exploded view of FIG. 4, the internal components of the cord spool are shown. The cord spool 28 is formed by two portions 38a and 38b of the case 38 which are joined at their peripheral rim 42 to seal the internal components within the case. The internal components include a rotatable core mandril 44 having a ratchet flange 46 attached to the mandril 44. The ratchet flange has spaced ratchet teeth 48 which engage a circular series of adjacent ratchet depressions 50 within the internal surface of the front portion 38a of the case. The ratchet flange is preferably flexible to provide a smooth operation when the ratchet teeth engage successive depressions. The return button 34 caps the end of the mandril 44 and projects through a core opening 52 in front fron portion 38a of the case. A flange 54 on the return button retains the button within the case and provides a contact surface against the ratchet flange 46 for displacing the ratchet flange and ratchet teeth away from the inside surface of the front portion of the case when the button is pressed.

A coiled leafspring 56 is mounted at one end to a flange cover 58 which is fixed by screws 60 to the back portion 38b of the case 38 and engageable at the other end in a slot 62 in the mandril 44. As the mandril is rotated by pulling and unwinding the cord, the leafspring is wound.

A helical compression spring 64 compressed within a hollow recess 68 in the mandril (shown in dotted line) contacts the inside of the flange cover 58 and maintains the ratchet flange in engagement with the ratchet depressions 50 in the case 38a. In this manner, the cord can be unwound from the mandril in any length and stopped. On depressing the return button, the ratchet teeth disengage and the coiled leafspring retracts the cord.

The cord is wound around the spool as shown in cross section in FIG. 4. In order to connect the electrical lines of the extractable segment 12c to the short segment, the extractable segment passes through the mandril to the recess 68 in the mandril and connects to the leafspring which carries the two individual electrical lines 70 on each peripheral edge of the leafspring. The leafspring itself comprises the ground line for the three electrical lines necessary for the transmit-receive system. In this manner, the cord is mechanically connected to the spool and the electrical lines in the cord are electrically connected through the spool.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A headset for communication systems comprising: transducer means; support means for supporting said transducer means on the head of an operator; a cord with electrical lines and a connector terminal, said electrical lines electrically connected at a first end to said transducer means and electrically connected at a second end to said connector terminal; and a cord spool, said cord having an intermediate mechanical connection with said cord spool forming a first segment of cord between said cord spool and said headset, said first segment between said cord spool and said headset being fixed in length, and a second segment between said cord spool and said connector terminal, said first segment and said second segment having electrical lines which are continuous through said cord spool, said cord spool having a rotatable mandril for storing said second segment of cord in a winding on said mandril, said cord spool further having retraction means for automatically retracting said second segment onto said mandril after said second segment has been manually withdrawn.

2. The headset of claim 1 wherein said transducer means comprises a receiver transducer, and wherein said cord has further a key for switching from transmit to receive connected to said first segment of cord, said key having switching means for switching between electrical lines connecting said receiver transducer and said transmitter transducer.

3. The headset of claim 1 wherein said retraction means includes a ratchet means for selectively maintaining in position a withdrawn length of said second segment of said cord, a return button adapted to disengage said ratchet means and a coiled leafspring means for rotating said mandril and retracting said cord.

4. The headset of claim 1 comprising further attachment means on said cord spool for attaching said spool to the person of an operator.

* * * * *